(12) United States Patent  
Spyropoulos et al.

(10) Patent No.: US 9,246,718 B2  
(45) Date of Patent: Jan. 26, 2016

(54) NON-COHERENT MULTI-SYMBOL-DELAY DIFFERENTIAL DETECTOR

(71) Applicant: MaxLinear, Inc., Carlsbad, CA (US)

(72) Inventors: Ioannis Spyropoulos, La Jolla, CA (US); Anand Anandakumar, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 14/602,837

(22) Filed: Jan. 22, 2015

(65) Prior Publication Data

US 2015/0207650 A1 Jul. 23, 2015

Related U.S. Application Data

(60) Provisional application No. 61/930,572, filed on Jan. 23, 2014.

(51) Int. Cl.
*H04L 25/03* (2006.01)

(52) U.S. Cl.
CPC .............................. *H04L 25/03184* (2013.01)

(58) Field of Classification Search
CPC ................................................ H04L 25/03184
See application file for complete search history.

(56) References Cited

U.S. PATENT DOCUMENTS

| | | | | |
|---|---|---|---|---|
| 6,002,711 A * | 12/1999 | Moon | .......................... | 375/142 |
| 7,899,107 B1 * | 3/2011 | Lee | .............................. | 375/141 |
| 8,000,380 B2 * | 8/2011 | Poegel | .......................... | 375/150 |
| 8,005,155 B1 * | 8/2011 | Lee et al. | ...................... | 375/260 |
| 8,031,784 B2 * | 10/2011 | Lee et al. | ...................... | 375/260 |

* cited by examiner

*Primary Examiner* — Leon Flores
(74) *Attorney, Agent, or Firm* — McAndrews, Held & Malloy, Ltd.

(57) ABSTRACT

An electronic receiver may generate a differential detection sequence based on a received symbol sequence and based on a m-symbol delayed version of the received symbol sequence, where m is an integer greater than 1. The particular differential detection sequence may be a result of an element-by-element multiplication of the particular received symbol sequence and the conjugate of an m-symbol delayed version of the particular received symbol sequence. The receiver may calculate differential decision metrics based on the differential detection sequence and based on a set of differential symbol sequences generated from the set of possible transmitted symbol sequences. The receiver may generate a decision as to which of a set of possible transmitted symbol sequences resulted in the received symbol sequence, where the decision is based on the differential decision metrics and the set of possible transmitted symbols sequences.

30 Claims, 7 Drawing Sheets

NON-COHERENT MULTI-SYMBOL-DELAY DIFFERENTIAL DETECTOR

PRIORITY CLAIM

This application claims priority to the following application(s), each of which is hereby incorporated herein by reference:

U.S. provisional patent application 61/930,572 titled "Non-coherent Multi-symbol-Delay Differential Detector" filed on Jan. 23, 2014.

BACKGROUND

Conventional methods and systems for signal detection in electronic receivers can be too unreliable for some applications. Further limitations and disadvantages of conventional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for non-coherent multi-symbol delay differential detection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). The following notation is used in this disclosure: $\{c_{i,k}\}$ is a set of sequences, where the i-th sequence has elements $c_{i,k}$. and i and k are integers; c (bolded) or $[c_k]$ is a sequence with elements $c_k$, where k is an integer; $c_k$ is an individual element of a sequence c or $[c_k]$.

Figure 1:
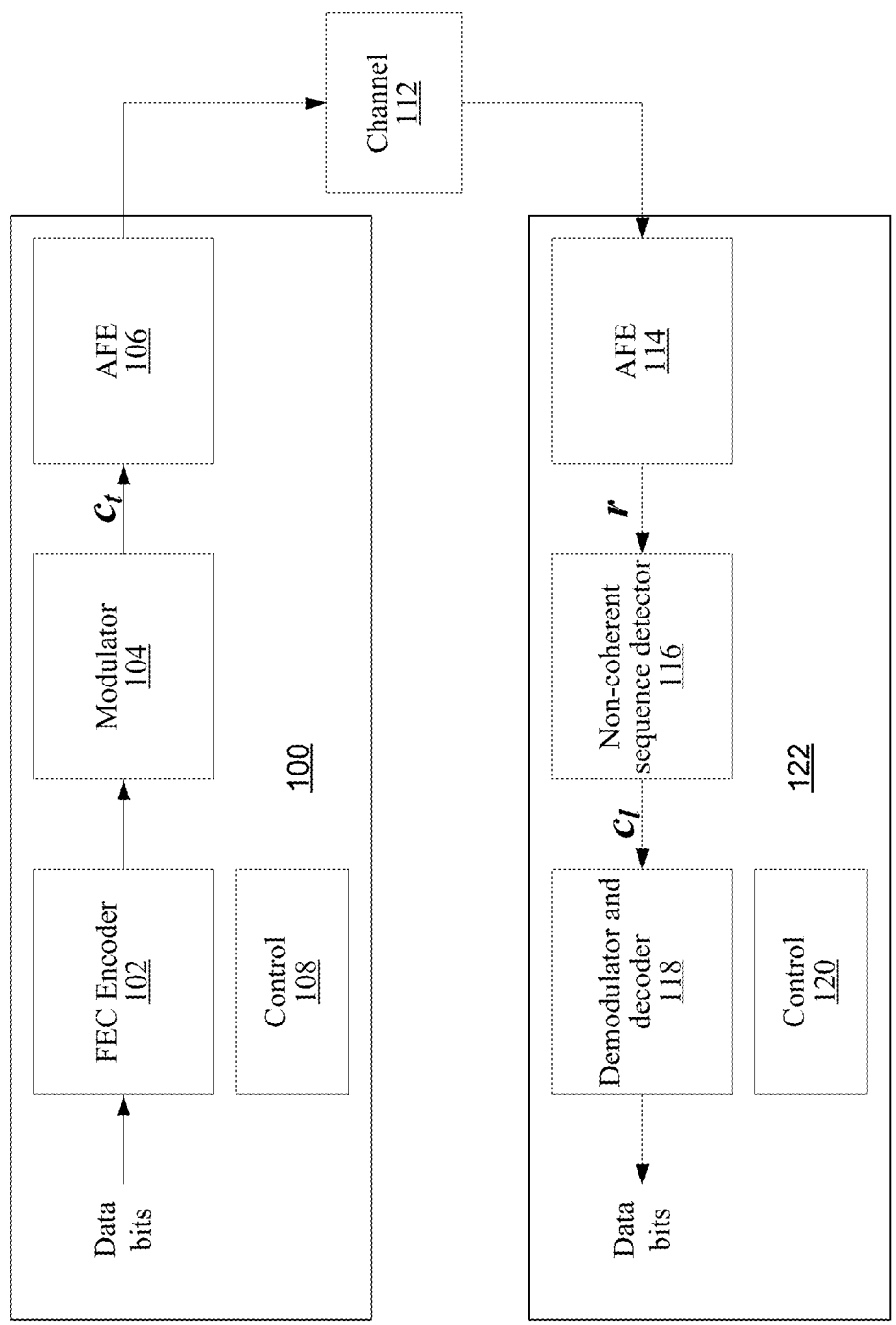
FIG. 1 depicts an example transmitter and receiver fit in accordance with an implementation of this disclosure.

FIG. 1 depicts an example transmitter and receiver fit in accordance with an implementation of this disclosure. The transmitter 100 comprises a forward error correction (FEC) encoder circuit 102, a modulator circuit 104, an analog front-end (AFE) circuit 106, and control circuitry 108. The receiver 122 comprises a demodulator and decoder circuit 118, a non-coherent sequence detector circuit 116, an analog front-end circuit 114, and a control circuitry 120. The transmitter 100 and receiver 122 communicate via channel 112, which may be wired, wireless, and/or optical.

Forward error correction encoder 102 accepts data bits and encodes them to generate a signal which is then modulated by modulator 104 resulting in modulated data sequence $c_l$, which is one of a set of possible transmit sequences $\{c_{i,k}\}$. The sequence $c_l$ is then processed by AFE 106 for transmission onto the channel 112.

Control circuitry 108 executes instructions and generates control signals for configuring the other components of the transmitter 100. In this regard, control circuitry 108 may determine an encoding and modulation (e.g., select from among plurality of symbol constellations) to use for transmitting at any given time.

The AFE 114 receives the signal via channel 112 and processes it to recover sequence r. Non-coherent sequence detector 116 processes the received sequence r as described below to determine which of the possible transmit sequences most likely corresponds to r. The most likely sequence $c_l$ is then output to demodulator and decoder 118, which, then, recovers the transmitted data bits.

Control circuitry 120 executes instructions and generates control signals for configuring the other components of the receiver 122. In this regard, control circuitry 120 may determine an encoding and modulation (e.g., select from among plurality of symbol constellations) to use for processing a particular received signal. Which encoding and modulation is selected may be determined based on a transmitter from which the receiver 122 desires to receive. Which encoding and modulation is to be used with any particular transmitter may be predetermined and/or determined based on previous communications with the particular transmitter.

Figure 2:
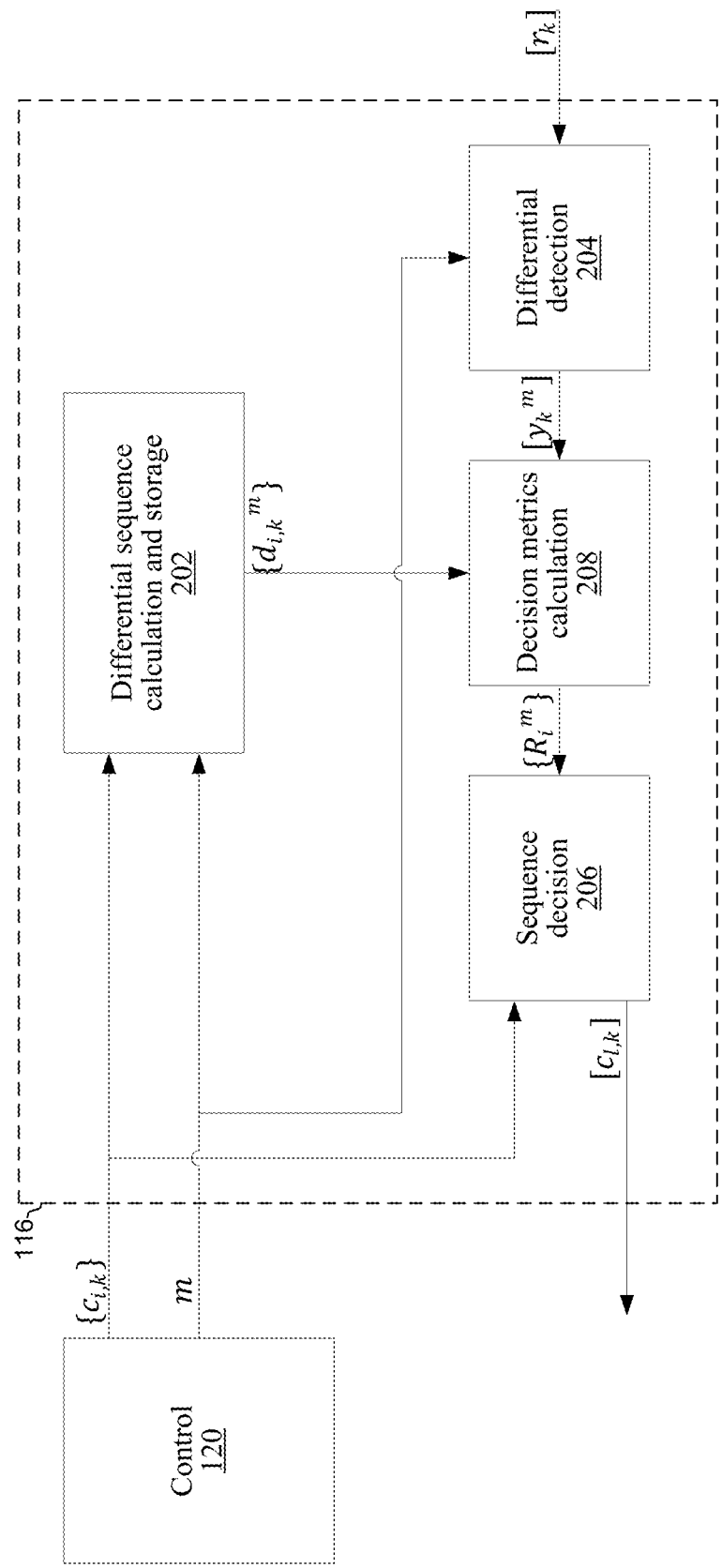
FIG. 2 depicts details of an example receiver in accordance with an implementation of this disclosure.

Now referring to FIG. 2, shown are example details of the non-coherent sequence detector 116. The example detector 116 comprises a differential sequence calculation and storage circuit 202, a differential detection circuit 204, a decision metrics calculation circuit 208, and a sequence decision circuit 206.

The differential sequence calculation and storage circuit 202 is operable to calculate, and store in memory, a set of differential symbol sequences $\{d_{i,k}^m\}$ from a set of possible transmit sequences $\{c_{i,k}\}$ and a selected delay value of m. In the example shown, $\{c_{i,k}\}$ and in are provided by control circuitry 120. The calculation may, for example, use equation (4) described below. The control circuitry 120 may comprise memory in which the set of possible transmitted sequences and selected value of m are stored.

The differential detection circuitry 204 is operable to generate a differential detection sequence $y^m=[y_k^m]$ based on the received sequence $r=[r_k]$ and the selected value of m, which in the example shown, is provided by the control circuitry 120. The calculation of the differential detection sequence may use the equation (2) below.

The decision metrics calculation circuitry 208 is operable to calculate differential decision metrics $\{R_i^m\}$ based on the detection sequence $[y_k^m]$ from circuit 204 and the set of differential symbol sequences $\{d_{i,k}^m\}$ from the circuit 202. This calculation may, for example, be as described by equation (5) below.

The sequence decision circuitry 206 is operable to determine which of the possible transmit sequences corresponds to the received signal based on the set of possible transmit sequences $\{c_{i,k}\}$ and the calculated decision metrics $\{R_i^m\}$.

Operation of the system of FIGS. 1 and 2 will now be described in greater detail.

Consider a set of L (an integer) modulated data sequences $\{c_{i,k}\}$, i=1, . . . , L; k=1, . . . N where each sequence encodes $\log_2(L)$ information bits to N (an integer) modulated data symbols, drawn from a selected symbol constellation; typically, each sequence is preceded by a fixed and known preamble of length M symbols (e.g., for the purpose of synchronization between the transmitter and receiver) such that the actual transmitted sequence is $c_t=[c_{t,-M+1}\ c_{t,-M+2} \ldots c_{t,0}\ c_{t,1}\ c_{t,2} \ldots c_{t,N}]$. Assume that, at a given time slot, one of these sequences is selected by a transmitter (such as transmitter 100 of FIG. 1) for transmission over a communication channel, at symbol rate $1/T_s$. The received symbols corresponding to the transmitted sequence, in the presence of frequency offset $\omega_d$, phase noise $\phi_k$, and additive white Gaussian noise (AWGN) $n_k$, are given by:

$$r_k = c_k e^{j(k\omega_d T_s + \phi_k)} + n_k \quad (1)$$

for k=−M+1, . . . , N.

A goal at the receiver is to detect the transmitted sequence out of the L possible sequences, given the received symbols $r_k$, and retrieve the encoded information bits with minimum probability of error.

Coherent detection on the received data symbols $r_k$ could be employed to maximize performance (or, equivalently, minimize the probability of error) for a given signal to noise ratio (SNR). However, coherent detection requires accurate tracking of the frequency offset $\omega_d$ and the phase noise $\phi_k$, which is not always feasible or practical, especially in power-limited communication scenarios where the receiver SNR is only a few decibels (dB) or even a fraction of one decibel. Furthermore, such a tracking requirement becomes particularly challenging if the sequences $\{c_{i,k}\}$ are short or if they are transmitted during the acquisition phase of a communication link for the purpose of receiver synchronization and/or physical later signaling (as is the case with the physical layer (PL) header sequences of the DVB-S2 satellite digital broadcast standard, which is described below as an example application of aspects of this disclosure). Alternatively, non-coherent detection may be used, which is insensitive to frequency offset and phase noise. SNR performance of non-coherent detection, however, is inferior compared to coherent detection because of noise enhancement due to non-coherent processing. Accordingly, aspects of this disclosure provide for non-coherent multi-symbol-delay differential detection which achieves improved SNR performance (i.e., lower probability of error) relative to conventional non-coherent detection, thus closing the gap to coherent detection.

Non-coherent differential detection in accordance with an implementation of this disclosure may comprise, for example, translating a received sequence $r=[r_{-M+1}\ r_{-M+2}, \ldots r_0\ r_1\ r_2 \ldots r_N]$ into a differential sequence of length N which is formed by conjugate multiplication of received symbols $r_k$ that are not necessarily contiguous to each other, as is the case with conventional non-coherent detection, but rather are at delay m≥1 from each other. The delay in may be chosen so that the minimum distance (e.g., Euclidean distance) between the corresponding differential transmit sequences is maximized (or nearly so, or is, at least, above a determined threshold). This may provide improved SNR performance on top of frequency offset and phase noise immunity. The optimum delay m may be determined based on the properties of specific FEC code and/or modulation scheme used to form the original transmit sequences. In an example implementation, delay m could be a parameter determined at the design phase of the communication system. In another example implementation, delay m may be dynamically configurable after the receiver has been deployed in the field and even during operation of the receiver. For example, the receiver may dynamically choose a mode of operation and the delay m may be selected based on the mode currently in use (e.g., based on a feedback loop during signal reception). Different modes of operation may, for example, correspond to different FEC encoding and/or modulation schemes. Different modes of operation may, for example, be selected for receiving from different transmitters. The value of m for a particular transmitter may be predetermined and/or have been determined during previous communications with that particular transmitter.

The receiver may, for example, form the m-th delay differential detection sequence $[y_k^m]$ from the received data symbols $r_k$ as follows:

$$y_k^m = r_k \cdot r_{k-m}^*, \quad (2)$$

for k=1, . . . , N, and 1≤m≤M.

For sufficiently high SNR and a phase noise process which is assumed to be linear across N+M symbols, this is can be accurately approximated as:

$$y_k^m \approx e^{j(m\omega_d T_s + \Delta\phi m)}(c_k \cdot c_{k-m}^* + \tilde{w}_k) \quad (3)$$

for k=1, . . . , N, and 1≤m≤M where $\tilde{w}_k$ is an additive white Gaussian noise (AWGN) process with twice the variance of the original AWGN $n_k$, and $\Delta\phi_m$ is a constant phase offset only dependent on m.

Now consider a new set of L (differential) sequences $\{d_{i,k}^m\}$ that is constructed from the original set $\{c_{i,k}\}$, as follows:

$$d_{i,k}^m = c_{i,k} \cdot c_{i,k-m}^*, \quad (4)$$

for i=1, . . . , L, and k=1, . . . , N

This set has its own distance properties, for a given distance definition (e.g., Euclidean distance), which are different from those of the original set $\{c_{i,k}\}$. In an example implementation, in is selected so that the minimum distance of the set of differential sequences $\{d_{i,k}^m\}$ is maximized (or is, at least, above a determined threshold).

Detecting the original transmitted sequence $[c_k]$, for k=1, . . . , N from the received symbols $r_k$ is equivalent to detecting the corresponding m-th delay differential sequence $[d_k^m]$ given the differential sequence $[y_k^m]$ formed by the receiver as shown in equation (2).

To perform this detection, a non-coherent detector in accordance with an example implementation of this disclosure may construct a set of decision metrics by correlating the differential detection sequence $[y_k^m]$ with each one of the differential sequences $\{d_{i,k}^m\}$ and computing the magnitude of this correlation, as follows:

$$R_i^m \triangleq |\Sigma_{k=1}^N y_k^m \cdot d_{i,k}^{m*}| \approx |\Sigma_{k=1}^N (c_k \cdot c_{k-m}^* + \tilde{w}_k) \cdot d_{i,k}^{m*}| \quad (5)$$

for i=1, . . . , L

Then, the non-coherent detector may decide on the l-th sequence $[c_{i,k}]$ having been transmitted by determining the l-th differential sequence that yields the maximum decision metric value, where:

$$l = \arg\max_{i=1,\ldots,L} R_i^m \quad (6)$$

For a detector in accordance with aspects of this disclosure, immunity to frequency offset and phase noise results from its non-coherent nature and the use of magnitude, which is inherently independent of the phase information, in the above decision metrics. For a detector in accordance with aspects of this disclosure, robustness in the presence of AWGN is improved compared to a conventional differential detector obtained for symbol delay m=1, due to in being chosen to guarantee the best distance properties of the differential sequences $\{d_{i,k}^m\}$.

Figure 3:
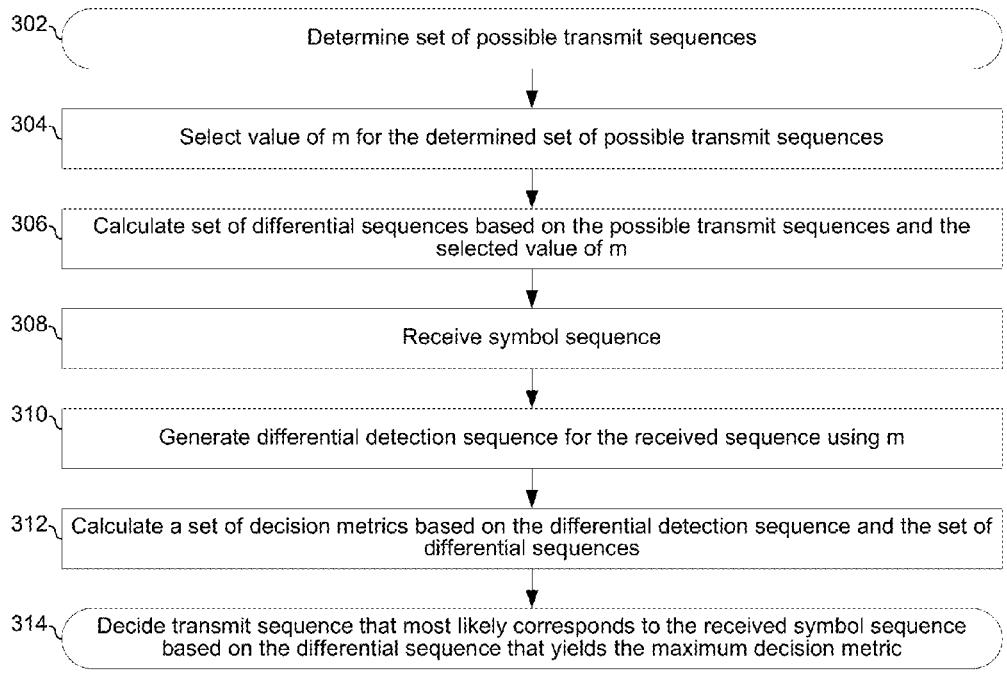
FIG. 3 is a flowchart of an example process for sequence detection in accordance with an implementation of this disclosure.

FIG. 3 is a flowchart of an example process for sequence detection in accordance with an implementation of this disclosure. The process begins with block 302 in which a set of possible transmit sequences $\{c_{i,k}\}$ is determined (e.g., received by receiver 122 via a control channel or selected by an operator of the receiver 122). In block 304, a value of m is selected for the determined set of possible transmit sequences. The value of m may be selected based, for example, on the type of modulating and FEC code used for generating the set of possible transmit sequences (which may, for example, be received via a control channel or selected by an operator of the receiver 122). In block 306, a set of differential sequences $\{d_{i,k}^m\}$ is calculated based on the determined set of possible transmit sequences and the selected value of m. In block 308, a symbol sequence r is received. In block 310, a differential detection sequence $[y_k^m]$ is generated for the received sequence using the selected value of m. In block 312, a set of decision metrics is calculated based on the differential detection sequence $[y_k^m]$ and the set of differential sequences $\{d_{i,k}^m\}$. In block 314, the transmit sequence that most likely corresponds to the received symbol sequence is decided based on the differential sequence that yields the maximum decision metric.

An example use of non-coherent differential detection as described herein is PL header detection in satellite digital broadcast systems following the DVB-S2 standard. In this regard, the PL header in the DVB-S2 standard is an example of the transmitted sequence $c_t$ described above, and thus may be detected using the techniques described above. Such an application of those techniques is described with reference to FIGS. 4A-4D.

Figure 4A:
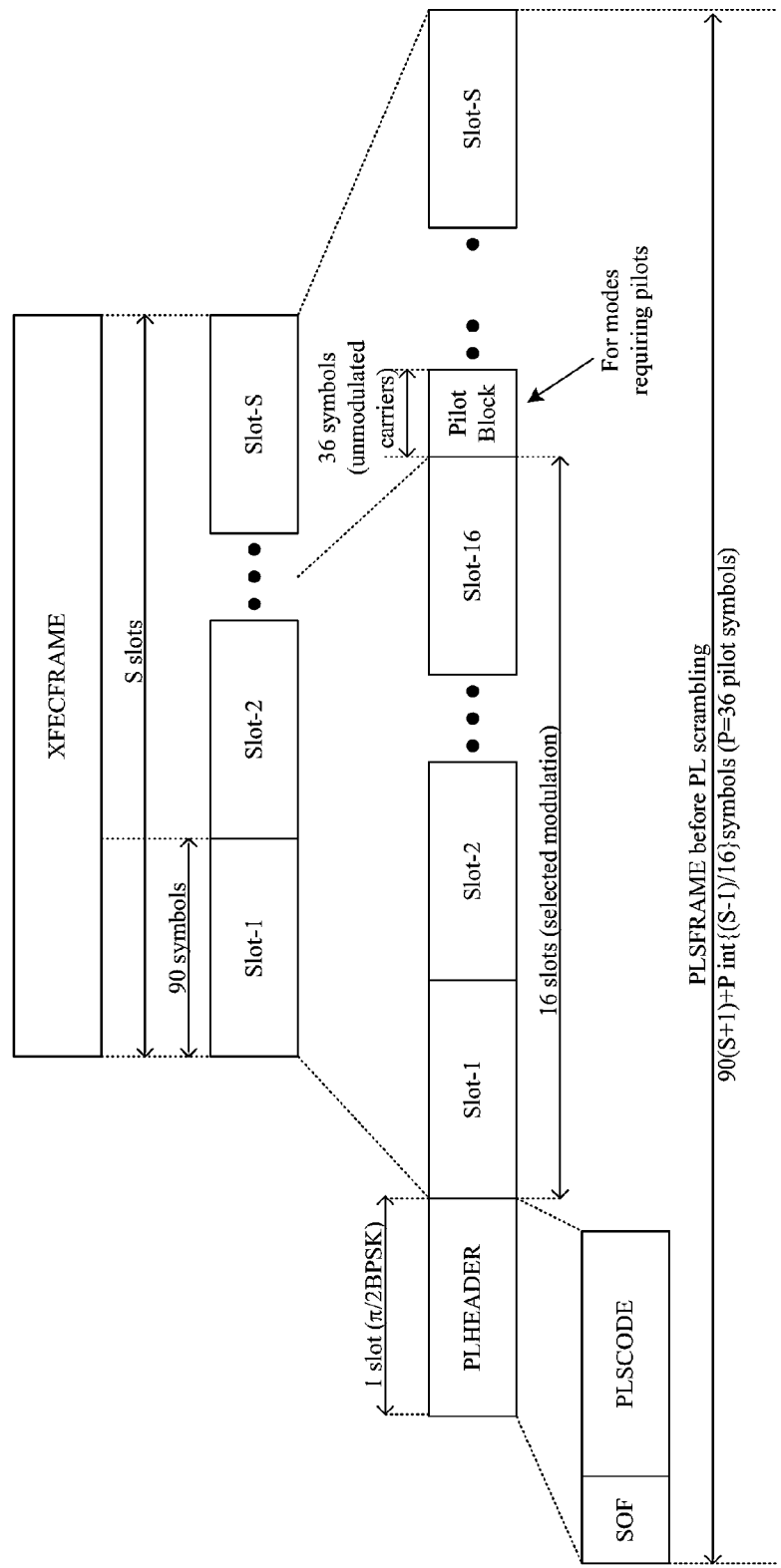
FIG. 4A depicts a physical layer (PL) frame according to the DVB-S2 satellite digital broadcast standard.
Figure 4B:
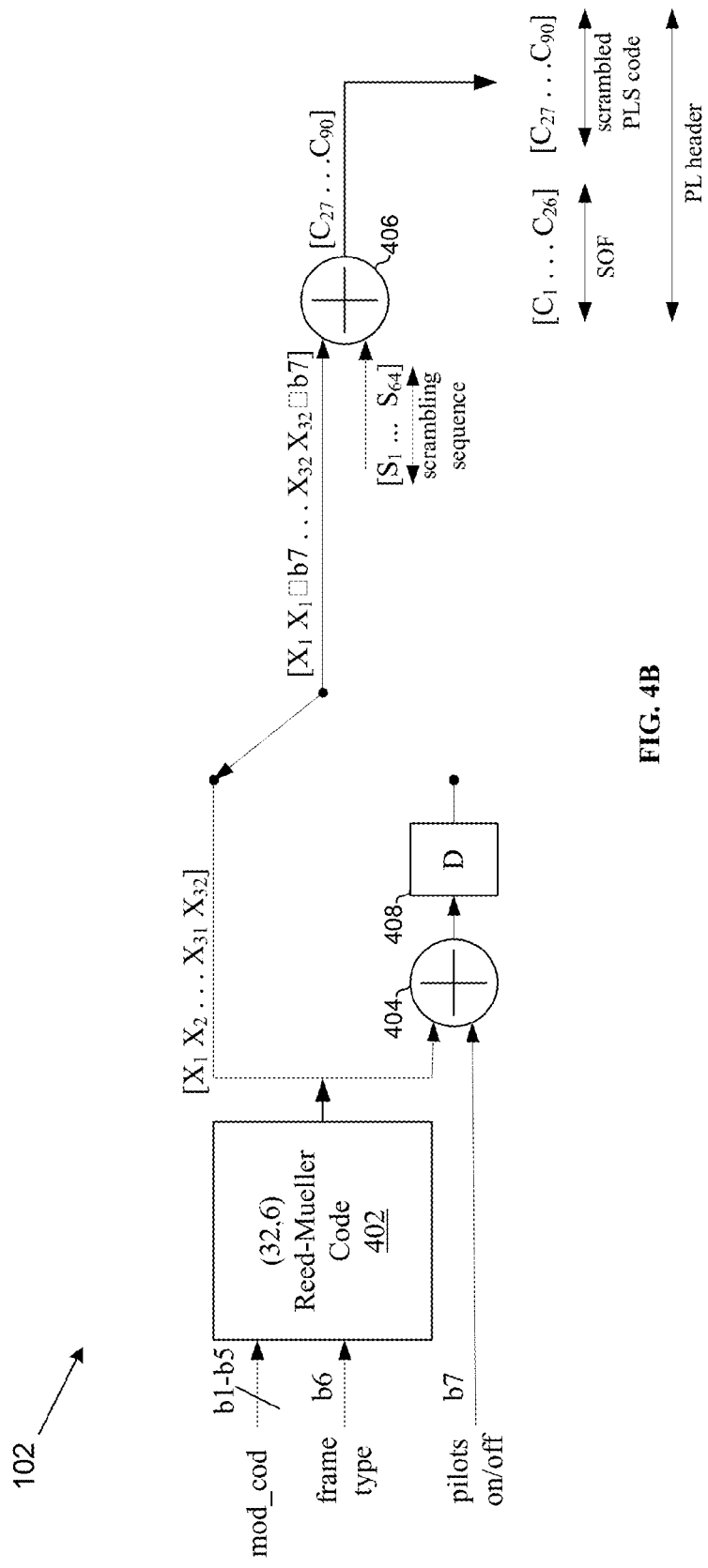
FIG. 4B depicts an encoder used for generating PL headers according to the DVB-S2 standard.
Figure 4C:
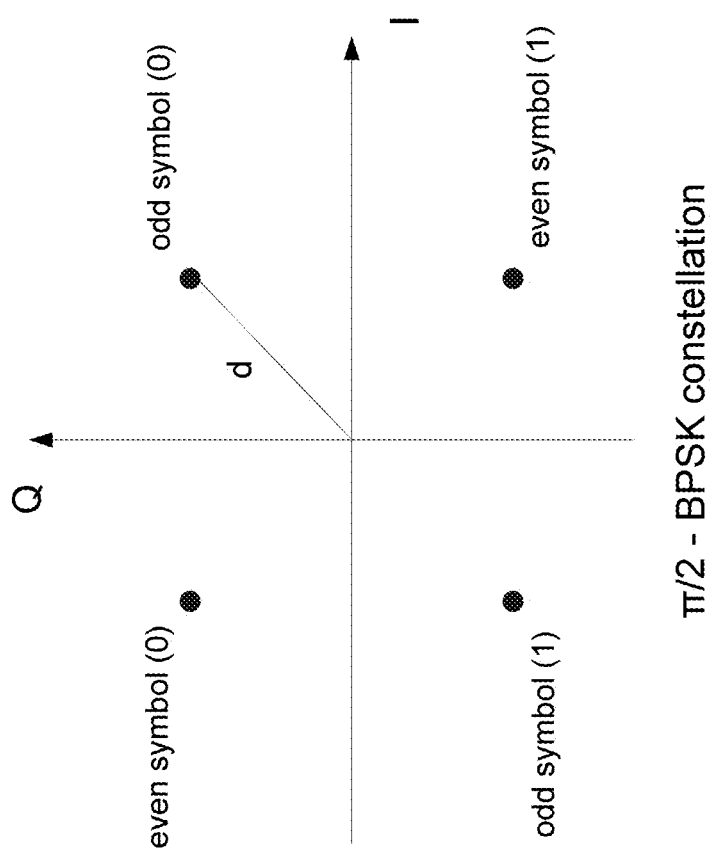
FIG. 4C depicts a constellation used for modulating PL header bits for transmission over the wireless channel according to the DVB-S2 standard.

According to the DVB-S2 standard, a PL header is inserted at the beginning of each transmitted frame with the purpose of receiver synchronization, and receiver configuration via physical layer signaling. The DVB-S2 frame structure is shown in FIG. 4A. The PL header consists of ninety binary symbols. Twenty-six of the symbols are start-of-frame (SOF) symbols, which are fixed and known. Sixty-four of the symbols are physical layer signaling symbols (PLS), each of which encodes seven bits of information using a generalized (64,7) Reed-Mueller FEC code. Out of these seven information bits, five bits signal the modulation type and FEC coding rate (mod_cod) used by the transmitter for data transmission in each one of the S data slots of the frame, one bit signals the frame length type (normal or short), and one bit indicates the presence or absence of pilot symbols in the frame. FIG. 4B depicts an encoder used for generating PL headers according to the DVB-S2 standard. FIG. 4C depicts the constellation used for modulating the PL header bits, which is an example of a constellation that may be used by the modulator 104 of FIG. 1.

Figure 4D:
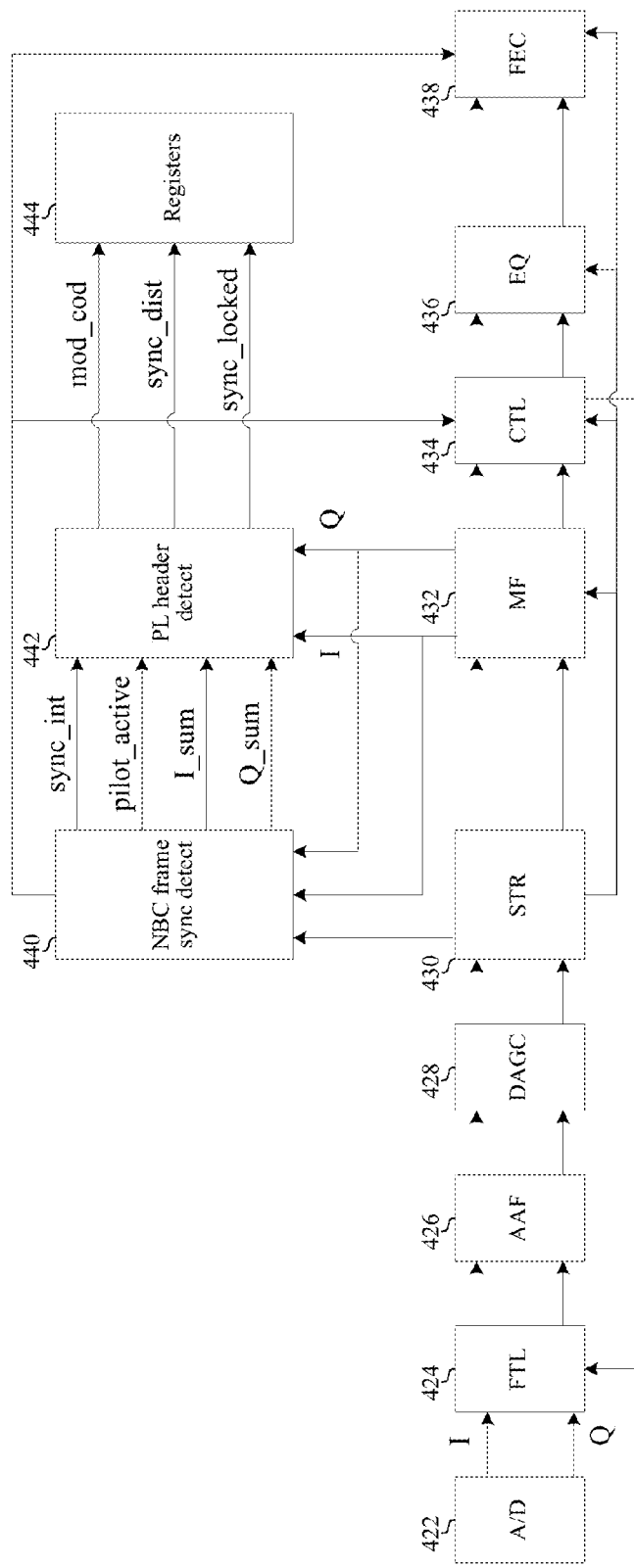
FIG. 4D depicts an example DVB-2S receiver that is operable to use non-coherent multi-symbol-delay differential detection in accordance with aspects of this invention, for detection of DVB-S2 PL headers.

FIG. 4D depicts an example DVB-2S receiver that is operable to use non-coherent multi-symbol-delay differential detection in accordance with aspects of this disclosure, for detection of DVB-S2 PL headers. A received signal is digitized via an analog-to-digital converter (A/D) 422 and then processed by frequency tracking loop 424 before being filtered by an anti-aliasing filter (AAF) 426 and then gain adjusted via digital automatic gain control (DAGC) circuit 428. The output of DAGC 428 is processed by the symbol timing recovery (STR) circuit 430. The STR 430 outputs I/Q signals to matched filter (MF) 432. Timing recovered by STR is conveyed to non-backwards compatible (NBC) frame sync detector circuit 440. The MF 432 outputs I/Q signals to carrier tracking loop (CTL) 432, which outputs I/Q signals to equalizer (EQ) 436. The output of the EQ 436 is then decoded by the forward error correction decoder (FEC) 438. The MF 432 also outputs I/Q signals to physical layer (PL) header detect circuit 442. The PL header detector circuit 442, which is an example implementation of the non-coherent sequence detector 116, implements non-coherent multi-symbol-delay differential detection as described herein to process the I/Q signal from MF 432 using controls signals from NBC frame sync detect 440 and recover mod_cod information, which is then stored to registers 444.

In operation, the receiver of FIG. 4D receives PL header symbols at rate $1/T_s$ in the presence of frequency offset $\omega_d$, phase noise $\phi_k$, and AWGN $n_k$:

$$r_k = c_k e^{j(k\omega_d T_s + \phi_k)} + n_k, \quad (7)$$

for k=1, . . . , 90.

A conventional non-coherent detector performs differential detection according to the following equation:

$$\begin{aligned} y_k^1 &= r_k \cdot r_{k-1}^* \\ &= (c_k e^{j(k\omega_d T_s + \varphi_k)} + n_k) \cdot (c_{k-1}^* e^{-j((k-1)\omega_d T_s + \varphi_{k-1})} + n_{k-1}^*) \\ &\approx c_k c_{k-1}^* e^{j(\omega_d T_s + \Delta \varphi)} + n_k c_{k-1}^* e^{-j((k-1)\omega_d T_s + \varphi_{k-1})} + \\ &\quad n_{k-1}^* c_k e^{j(k\omega_d T_s + \varphi_k)} \\ &\approx c_k c_{k-1}^* e^{j(w_d T_s + \Delta \varphi)} + w_k \\ &= e^{j(\omega_d T_s + \Delta \varphi)} (c_k c_{k-1}^* + \tilde{w}_k) \end{aligned} \quad (8)$$

The differentially detected signal is insensitive to frequency offset but is impaired by approximately two times the noise power. In accordance with an example implementation of this disclosure, m-th order differential detection may be applied, instead, for m>1:

$$y_k^m = r_k \cdot r_{k-m}^* \approx e^{j(m\omega_d T_s + \Delta \phi m)} (c_k c_{k-m}^* + \tilde{w}_k) \quad (9)$$

for k=1, . . . , 90

Considering only the last sixty-four PLS code symbols, which encode the physical layer signaling information, a new (differential) code can be generated with L codewords, each one corresponding to one of the L PLS original codewords:

$$\{d_{i,k-26}{}^m\}=\{c_{i,k}c_{i,k-m}{}^*\}, \quad (10)$$

i=1, ..., L; k=27, ..., 90

In order to decode mod_cod and frame type, it suffices to determine the m-th order differential codeword corresponding to the transmitted PLS codeword, given the differentially detected symbols $y_k{}^m$, k=27, ..., 90.

In this example, the non-coherent detector may form the following decision metrics:

$$R_i^m \triangleq \left| \sum_{k=27}^{90} y_k^m \cdot d_{i,k-26}^{m*} \right| \approx \left| \sum_{k=27}^{90} (c_k \cdot c_{k-m} + \tilde{w}_k) \cdot d_{i,k-26}^{m*} \right| \quad (11)$$

$$i = 1, \ldots, L;$$

and decide that the l-th PLS codeword has been transmitted by determining the l-th differential codeword that maximizes the above expression, where:

$$l = \arg\max_{i=1,\ldots,L} R_i^m \quad (12)$$

It is noted that $R_i{}^m$, i=1, ..., L are independent of the frequency offset $\omega_d$ and phase noise $\phi_k$. In DVB-S2 standard, mod_cod may take on 32 distinct values, from 0 to 31. In addition, assuming that the presence or absence of pilot symbols in the frame is determined by the NBC frame sync detector 440 and then signaled to the PL header detector 442 (via a pilot_active control signal, as shown in FIG. 4D), the PL header detector has to decide among L=64 PLS codewords. For a given value of m, the L=64 differential codewords are derived from the respective 64-bit PLS codewords and the last m least significant bits (LSB) of the SOF field according to equation (10), and they have a length equal to 64. Accordingly, the delay m can take any value between 1 and M=26. A first-order approximation for the PLS codeword (i.e., mod_cod) error probability of the non-coherent PL header detector described herein is given by the pair-wise probability between two differential codewords at minimum distance $\delta_{min}$, as follows:

$$P_{mod\_cod} \approx P_{pair-wise} = Q(\sqrt{SNR \cdot R_c \cdot \delta_{min}}) \quad (13)$$

where SNR is the signal to noise ratio at the receiver, $R_c$ is the PLS coding rate, and Q(x) is the complementary cumulative distribution function (CCDF) of the normal Gaussian distribution. Note that the minimum distance $\delta_{min}$ is a function of the delay m, and the non-coherent PL header detector described herein may be configured to minimize the above pair-wise probability by selecting the delay value m that maximizes $\delta_{min}$.

In accordance with an example implementation of this disclosure, an electronic receiver (e.g., 122) may generate, via differential detection circuitry (e.g., 204), a differential detection sequence based on a received symbol sequence and based on a m-symbol delayed version of the received symbol sequence, where m is an integer greater than 1. The particular differential detection sequence may be a result of an element-by-element multiplication of the particular received symbol sequence and the conjugate of an m-symbol delayed version of the particular received symbol sequence. The receiver may calculate, via decision metrics calculation circuitry (e.g. 208), differential decision metrics based on the differential detection sequence and based on a set of differential symbol sequences generated (e.g., by differential sequence calculation circuitry 202) from the set of possible transmitted symbol sequences. The calculating of the differential decision metrics may be based on the magnitude of the correlation between the differential detection sequence and each differential symbol sequence from the set of differential symbol sequences. The receiver may generate, via sequence decision circuitry (e.g., 206), a decision as to which of a set of possible transmitted symbol sequences resulted in the received symbol sequence, where the decision is based on the differential decision metrics and the set of possible transmitted symbols sequences. The generating of the decision may be based on the particular transmitted symbol sequence index that results in the maximum differential decision metric. The received symbol sequence may correspond to a transmitted symbol sequence output by a forward error correction encoder (e.g., 102) and modulator (e.g., 104). A particular differential symbol sequence in the set of differential symbol sequences may be based on a particular sequence of the set of possible transmitted symbol sequences and an m-symbol delayed version of the particular sequence of the set of possible transmitted symbol sequences. The particular differential symbol sequence may be a result of an element-by-element multiplication of the particular sequence of the set of possible transmitted symbol sequences and the conjugate of the m-symbol delayed version of the particular sequence of the set of possible transmitted symbol sequences. The value of m may be selected based on a minimum distance of the set of differential symbol sequences. The value of m may be selected based on a mode of operation of the electronic receiver. The value of m may be selected based on a transmitter from which communications are to be received by the electronic receiver. The value of m may be selected based on a type of modulation and FEC code used for a signal to be received by the electronic receiver.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    an electronic receiver comprising:
        differential detection circuitry operable to generate a differential detection sequence based on a received symbol sequence and based on an m-symbol delayed version of said received symbol sequence, where the value of m is an integer greater than 1;
        decision metrics calculation circuitry operable to calculate differential decision metrics based on said differential detection sequence, wherein said calculation of said differential decision metrics is based on a set of differential symbol sequences generated from a set of possible transmitted symbol sequences; and
        sequence decision circuitry operable to generate a decision as to which of said set of possible transmitted symbol sequences resulted in said received symbol sequence, where said decision is based on said differential decision metrics and the value of m is selected based on a minimum distance of said set of differential symbol sequences.

2. The system of claim 1, wherein said generation of said differential detection sequence is based on an element-by-element multiplication of said received symbol sequence and the conjugate of said m-symbol delayed version of said received symbol sequence.

3. The system of claim 1, wherein a particular differential symbol sequence in said set of differential symbol sequences is based on a particular sequence of said set of possible transmitted symbol sequences and an m-symbol delayed version of said particular sequence of said set of possible transmitted symbol sequences.

4. The system of claim 3, wherein said particular differential symbol sequence is a result of an element-by-element multiplication of said particular sequence of said set of possible transmitted symbol sequences and the conjugate of said m-symbol delayed version of said particular sequence of said set of possible transmitted symbol sequences.

5. The system of claim 1, wherein said calculation of said differential decision metrics is based on a correlation of said differential detection sequence with each differential symbol sequence in said set of differential symbol sequences.

6. The system of claim 1, wherein the value of m is selected based on a mode of operation of said electronic receiver.

7. The system of claim 1, wherein the value of m is selected based on a transmitter from which communications are to be received by said electronic receiver.

8. A system comprising:
    an electronic receiver comprising:
        differential detection circuitry operable to generate a differential detection sequence based on a received symbol sequence and based on an m-symbol delayed version of said received symbol sequence, wherein the value of m is an integer greater than 1 and is selected based on a type of modulation and forward error correction (FEC) code used for a signal to be received by said electronic receiver;
        decision metrics calculation circuitry operable to calculate differential decision metrics based on said differential detection sequence; and
        sequence decision circuitry operable to generate a decision as to which of a set of possible transmitted symbol sequences resulted in said received symbol sequence, where said decision is based on said differential decision metrics.

9. The system of claim 8, wherein said generation of said differential detection sequence is based on an element-by-element multiplication of said received symbol sequence and the conjugate of said m-symbol delayed version of said received symbol sequence.

10. The system of claim 8, wherein said calculation of said differential decision metrics is based on a set of differential symbol sequences generated from said set of possible transmitted symbol sequences.

11. The system of claim 10, wherein a particular differential symbol sequence in said set of differential symbol sequences is based on a particular sequence of said set of possible transmitted symbol sequences and an m-symbol delayed version of said particular sequence of said set of possible transmitted symbol sequences.

12. The system of claim 11, wherein said particular differential symbol sequence is a result of an element-by-element multiplication of said particular sequence of said set of possible transmitted symbol sequences and the conjugate of said m-symbol delayed version of said particular sequence of said set of possible transmitted symbol sequences.

13. The system of claim 10, wherein said calculation of said differential decision metrics is based on a correlation of said differential detection sequence with each differential symbol sequence in said set of differential symbol sequences.

14. The system of claim 8, wherein the value of m is selected based on a mode of operation of said electronic receiver.

15. The system of claim 8, wherein the value of m is selected based on a transmitter from which communications are to be received by said electronic receiver.

16. A method comprising:
    in an electronic receiver:
        generating, via differential detection circuitry of said receiver, a differential detection sequence based on a received symbol sequence and based on an m-symbol delayed version of said received symbol sequence, where m is an integer greater than 1;
        calculating, via decision metrics calculation circuit, differential decision metrics based on said differential detection sequence, wherein said calculating said decision metrics is based on a set of differential symbol sequences generated from a set of possible transmitted symbol sequences; and
        generating, via sequence decision circuitry of said receiver, a decision as to which of said set of possible transmitted symbol sequences resulted in said received symbol sequence, where said decision is based on said differential decision metrics and the value of m is selected based on a minimum distance of said set of differential symbol sequences.

17. The method of claim 16, wherein said calculating said differential detection sequence is based on an element-by-element multiplication of said received symbol sequence and the conjugate of said m-symbol delayed version of said received symbol sequence.

18. The method of claim 16, wherein a particular differential symbol sequence in said set of differential symbol sequences is based on a particular sequence of said set of possible transmitted symbol sequences and an m-symbol delayed version of said particular sequence of said set of possible transmitted symbol sequences.

19. The method of claim 18, wherein said particular differential symbol sequence is a result of an element-by-element multiplication of said particular sequence of said set of possible transmitted symbol sequences and the conjugate of said m-symbol delayed version of said particular sequence of said set of possible transmitted symbol sequences.

20. The method of claim 16, wherein said calculating said differential decision metrics comprises correlating said differential detection sequence with each differential symbol sequence in said set of differential symbol sequences.

21. The method of claim 16, wherein the value of m is selected based on a mode of operation of said electronic receiver.

22. The method of claim 16, wherein the value of m is selected based on a transmitter from which communications are to be received by said electronic receiver.

23. The method of claim 16,
in an electronic receiver:
   generating, via differential detection circuitry of said receiver, a differential detection sequence based on a received symbol sequence and based on an m-symbol delayed version of said received symbol sequence, wherein the value of m is an integer greater than 1 and is selected based on a type of modulation and forward error correction (FEC) code used for a signal to be received by said electronic receiver;
   calculating, via decision metrics calculation circuit, differential decision metrics based on said differential detection sequence; and
   generating, via sequence decision circuitry of said receiver, a decision as to which of a set of possible transmitted symbol sequences resulted in said received symbol sequence, where said decision is based on said differential decision metrics.

24. The method of claim 23, wherein said calculating said differential detection sequence is based on an element-by-element multiplication of said received symbol sequence and the conjugate of said m-symbol delayed version of said received symbol sequence.

25. The method of claim 23, wherein said calculating said differential decision metrics is based on a set of differential symbol sequences generated from said set of possible transmitted symbol sequences.

26. The method of claim 25, wherein a particular differential symbol sequence in said set of differential symbol sequences is based on a particular sequence of said set of possible transmitted symbol sequences and an m-symbol delayed version of said particular sequence of said set of possible transmitted symbol sequences.

27. The method of claim 26, wherein said particular differential symbol sequence is a result of an element-by-element multiplication of said particular sequence of said set of possible transmitted symbol sequences and the conjugate of said m-symbol delayed version of said particular sequence of said set of possible transmitted symbol sequences.

28. The method of claim 25, wherein said calculating said differential decision metrics comprises correlating said differential detection sequence with each differential symbol sequence in said set of differential symbol sequences.

29. The method of claim 23, wherein the value of m is selected based on a mode of operation of said electronic receiver.

30. The method of claim 23, wherein the value of m is selected based on a transmitter from which communications are to be received by said electronic receiver.

\* \* \* \* \*